United States Patent

Depp et al.

[11] Patent Number: 5,831,698
[45] Date of Patent: Nov. 3, 1998

[54] ELECTRICALLY VARIABLE DIFFUSER

[75] Inventors: Steven W. Depp, Katonah, N.Y.; Anthony Cyril Lowe, Braishfield, United Kingdom; Robert Luke Wisnieff, Yorktown Heights, N.Y.

[73] Assignee: International Business Machines Corporation, Armonk, N.Y.

[21] Appl. No.: 700,189

[22] Filed: Aug. 20, 1996

[51] Int. Cl.⁶ ............. G02F 1/1335; G02F 1/1347
[52] U.S. Cl. ............. 349/64; 349/112; 349/74
[58] Field of Search ................. 349/69, 74, 112

[56] References Cited

U.S. PATENT DOCUMENTS

| | | | |
|---|---|---|---|
| 4,606,611 | 8/1986 | Fergason | 350/334 |
| 4,732,456 | 3/1988 | Fergason et al. | 350/334 |
| 4,832,458 | 5/1989 | Fergason et al. | 350/338 |
| 5,136,403 | 8/1992 | Jones et al. | 359/52 |
| 5,138,472 | 8/1992 | Jones et al. | 359/52 |
| 5,301,046 | 4/1994 | Konuma et al. | 359/51 |
| 5,317,435 | 5/1994 | Kasazumi | 349/64 |
| 5,400,156 | 3/1995 | Konuma et al. | 359/51 |
| 5,583,674 | 12/1996 | Mosley | 349/74 |
| 5,644,369 | 7/1997 | Jachimowicz et al. | 349/112 |
| 5,659,408 | 8/1997 | Wenyon | 349/64 |

FOREIGN PATENT DOCUMENTS

| | | | |
|---|---|---|---|
| 544332 | 6/1993 | European Pat. Off. | 349/64 |
| 57-610 | 1/1982 | Japan | 349/74 |
| 2 215 898 | 9/1989 | United Kingdom . | |

*Primary Examiner*—William L. Sikes
*Assistant Examiner*—Tiep H. Nguyen
*Attorney, Agent, or Firm*—Scully, Scott, Murphy & Presser

[57] ABSTRACT

A display having an electrically variable diffuser is disclosed. In response to an electric field, the electrically variable diffuser is electrically switched from a low illumination/narrow viewing angle mode to a high illumination/wide viewing angle mode. The viewing angle is correlated with backlight luminance to provide an adequate display as the viewing angle is varied. This allows a user to choose between preserving battery life and maximizing viewing angle.

16 Claims, 3 Drawing Sheets

ELECTRICALLY VARIABLE DIFFUSER

BACKGROUND OF THE INVENTION

1. Field of the Invention

The present invention is directed to an electrically variable diffuser used in displays, and more particularly, to an electrically variable diffuser that varies viewing angle of displays in relation to the intensity of display illumination.

2. Discussion of the Prior Art

Portable computers require high quality visual displays having wide viewing angles and minimum battery power consumption. In general, these requirements cannot simultaneously be satisfied. Existing portable computers have adequate display visual quality and battery power consumption. However, neither visual quality nor power consumption is optimized. Typically, battery power consumption is minimized by reducing the power consumption of the display backlight. However, for adequate display luminance, reduction of the display backlight requires restricting the solid viewing angle over which the backlight radiation is distributed.

Restricting the viewing angle reduces the display visual performance.

FIG. 1 shows a conventional backlit liquid crystal (LC) display 10. A light source 12 is provided at the back of the display 10. The light source 12 provides light through a light guide 14. The light guide 14 allows light to escape toward the display front at approximately equal intensity from left to right. A diffuser 16 scatters the light received from the light guide 14 and corrects any local non-uniformity of emissions from the light guide 14. A brightness enhancing film 18 receives the substantially uniform emissions from the diffuser 16 and outputs a light having a reduced solid viewing angle.

The light output from the brightness enhancing film 18 travels through a rear polarizer 20 to reach a liquid crystal (LC) cell 22. The LC cell 22 may include transmission type light valves which are well known in the art. Light emitted from the LC cell 22 travels through a front polarizer 24 to form an image on the display 10.

The reduced viewing angle reduces the backlight power required to produce adequate luminance. The reduced backlight power is a desirable characteristic of displays, since the period between battery recharging is increased. However, reduction of the viewing angle by the brightness enhancing film 18 is not desirable in displays. Thus, the conventional display 10 is inadequate for group viewing, where a wide solid viewing angle is required.

If the brightness enhancing film 18 is chosen to provide a wide viewing angle, then the intensity and consequently the power consumption of the display backlight must be increased to provide adequate luminance. Such a display is also inadequate, since the period between battery recharging is reduced.

SUMMARY OF THE INVENTION

The object of the present invention is to provide a display that eliminates the problems of conventional displays.

Another object of the present invention is to provide a display where a user can choose between preserving battery life and maximizing viewing angle.

These and other objects of the present invention are achieved by a display having an electrically variable diffuser that varies the viewing angle in relation to backlight intensity. The intensity is varied in accordance with the varying viewing angle to provide adequate display luminance. The viewing angle is varied by electrically varying the variable diffuser between a substantially transparent state and a scattering state. The substantially transparent state is a low power narrow viewing angle mode. The scattering state is a high power wide viewing angle mode.

The display has illumination means to illuminate a cell. The illumination means includes at least one light source. A light guide receives light from the light source and provides substantially equal intensity light to the cell. A diffuser may be used to scatter light received from the light guide. A brightness enhancing film reduces the solid viewing angle over which light is delivered to the cell. The cell may be surrounded by rear and front polarizers.

The electrically variable diffuser may be located between the illumination means and the cell. Alternatively, the electrically variable diffuser may be located at the front of the cell. The electrically variable diffuser may be formed from a liquid crystal, such as a nematic liquid crystal, which may be a chiral nematic liquid crystal. Alternatively, the electrically variable diffuser may be formed from a polymer dispersed liquid crystal or a polymer stabilized cholesteric texture liquid crystal. The electrically variable diffuser may also be formed from an electrically switchable holographic medium.

The inventive display provides a user with an option to choose between preserving battery life and maximizing viewing angle. For example, the user may switch to a low power/private viewing mode, where the display backlight and the viewing angle are reduced. Alternatively, the user may switch to a high power/wide angle or group viewing mode, where the display backlight and the viewing angle are increased. Thus, depending on the requirement, a user chooses whether to preserve battery life or to maximize viewing angle.

DETAILED DESCRIPTION OF THE INVENTION

Figure 1:
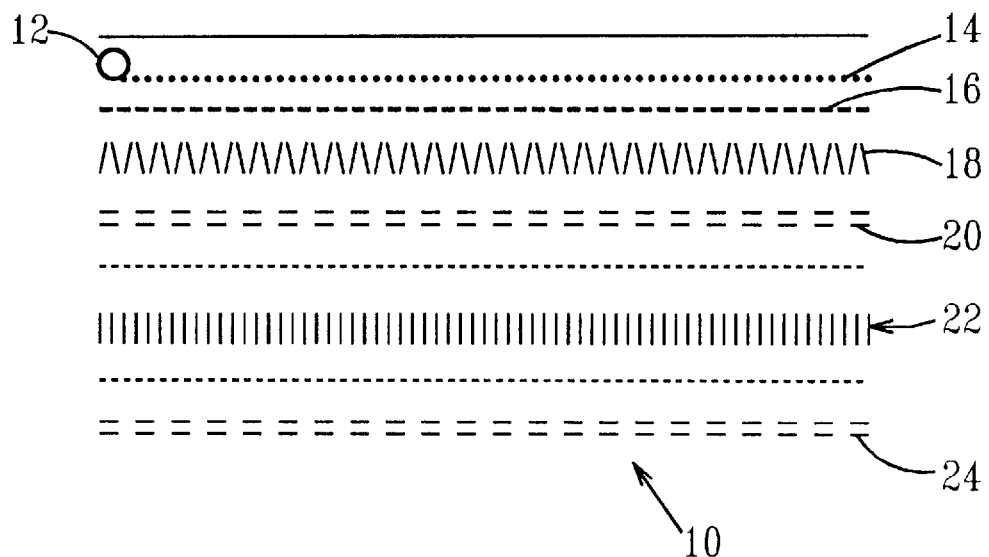
FIG. 1 shows a schematic of a conventional display.
Figure 2:
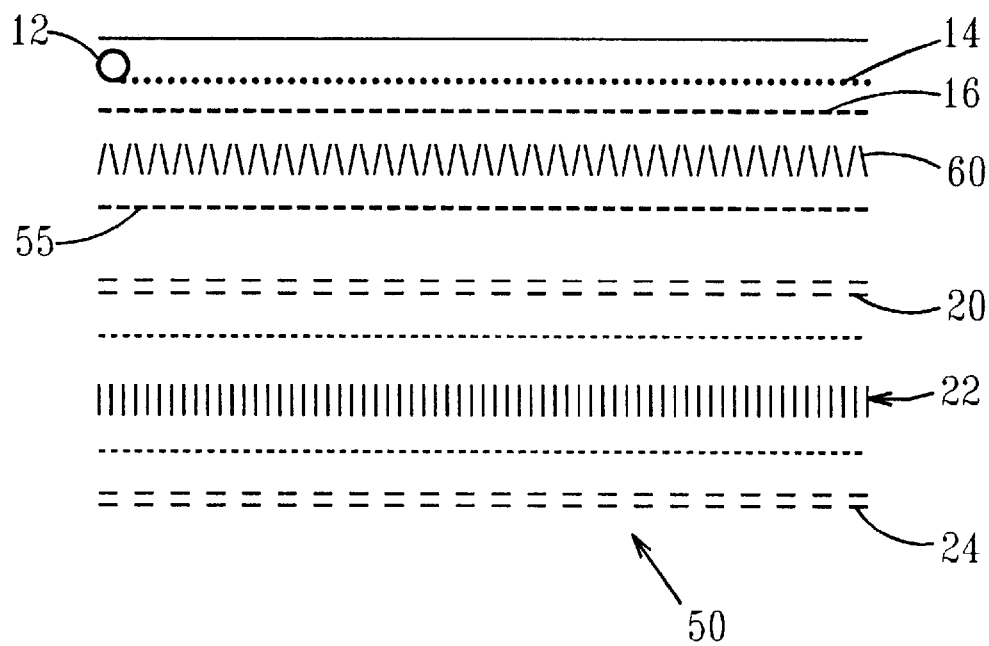
FIG. 2 shows a schematic of one embodiment of a display according to the present invention.

FIG. 2 shows a display 50 which is one embodiment of the present invention. Elements common between the figures have common reference numbers. The display 50 is similar to the conventional display 10 shown in FIG. 1, with one major difference: an electrically switchable diffuser element 55. The electrically switchable diffuser element 55 may replace the existing diffuser 16. Alternatively, the switchable diffuser 55 may be provided in addition to the existing diffuser 16. In the embodiment shown in FIG. 2, the electrically switchable diffuser 55 is inserted between the brightness enhancing film 18 and the rear polarizer 20.

As shown in FIG. 2, the display device 50 has a light source 12 which provides light to a light guide 14. The light guide 14 illuminates the diffuser 16 with light of substantially equal intensity. The diffuser 16 scatters the light and corrects any local non-uniformity of emissions from the light guide 14.

A brightness enhancing film 60 receives the uniform emissions from the diffuser 16. The brightness enhancing film 60 differs from the conventional brightness enhancing film 18 of FIG. 1. The brightness enhancing film 60 provides a more collimated beam of light having a solid viewing angle which is much narrower then that of the conventional brightness enhancing film 18.

Light travels through the electrically switchable or variable diffuser 55 and forms an image on the display 50. Light from the variable diffuser 55 travels through the rear polarizer 20, the LC cell 22, and the front polarizer 24 to form the image in the same manner as conventional displays.

Because the brightness enhancing film 60 illuminates only a narrow solid angle, the power to the backlight 12 may be reduced without deleterious effects. The reduced backlight power, in combination with the reduced viewing angle, provides adequate display luminance. The reduced viewing angle, provided by the brightness enhancing film 60 reduces the upper limit of the range of available viewing angles. This increases the range of available viewing angles since the upper limit of this range is lower than that for conventional displays.

The electrically switchable diffuser 55 can be switched electrically from a transparent or weakly diffusing/scattering state to a more strongly diffusing state. This is achieved by applying an electrical field to switch the diffuser from an off-state to an on-state. Applying the electric field across the electrically switchable or variable diffuser 55 increases the viewing angle. In the on-state, the display has a wide viewing angle and high power consumption.

In the off-state, where the electric field is absent, the diffusing film 55 is transparent and provides a display that has a narrow viewing angle and a low power consumption. In the off-state, the switchable diffuser 55 is transparent. Thus, the viewing angle of the display 50 is the narrow viewing angle provided by the brightness enhancing film 60. This display mode may be referred to as the low power/private viewing mode.

In the low power/private viewing mode, the solid viewing angle is narrow due to the narrow viewing angle provided by the brightness enhancing film 60. In this mode, the power to the backlight 12 is low. Thus, little battery power is consumed. Despite the low power resulting in low illumination, adequate display luminance is achieved because of the narrow viewing angle.

By applying an electric field across the variable diffuser 55, the display mode progressively varies from the low power/private viewing mode to a high power/group viewing mode. In high power/group viewing mode, the variable diffuser 55 is in the on-state. In response to the increasing electric field, light scattering of the variable diffuser 55 is progressively increased to scatter light over wider solid angles. This increases the viewing angle.

In the on-state, the backlight power is increased so that adequate display luminance is achieved over the wide viewing angle. Power consumption is high, but display visual performance is optimized for a wide angle group viewing mode.

As such, a user may vary the viewing angle. The power consumption is optimized in relation to the viewing angle. The user can choose between preserving battery life and maximizing viewing angle. For example, the user may switch to the low power/private viewing mode, where the display backlight and the viewing angle are reduced. Alternatively, the user may switch to the high power/wide angle or group viewing mode, where the display backlight and the viewing angle are increased. Of course, the user can also choose any desired viewing angle/power consumption within the range of the available viewing angles. Thus, depending on the requirement, the user chooses whether to preserve battery life or to maximize viewing angle.

Figure 3:
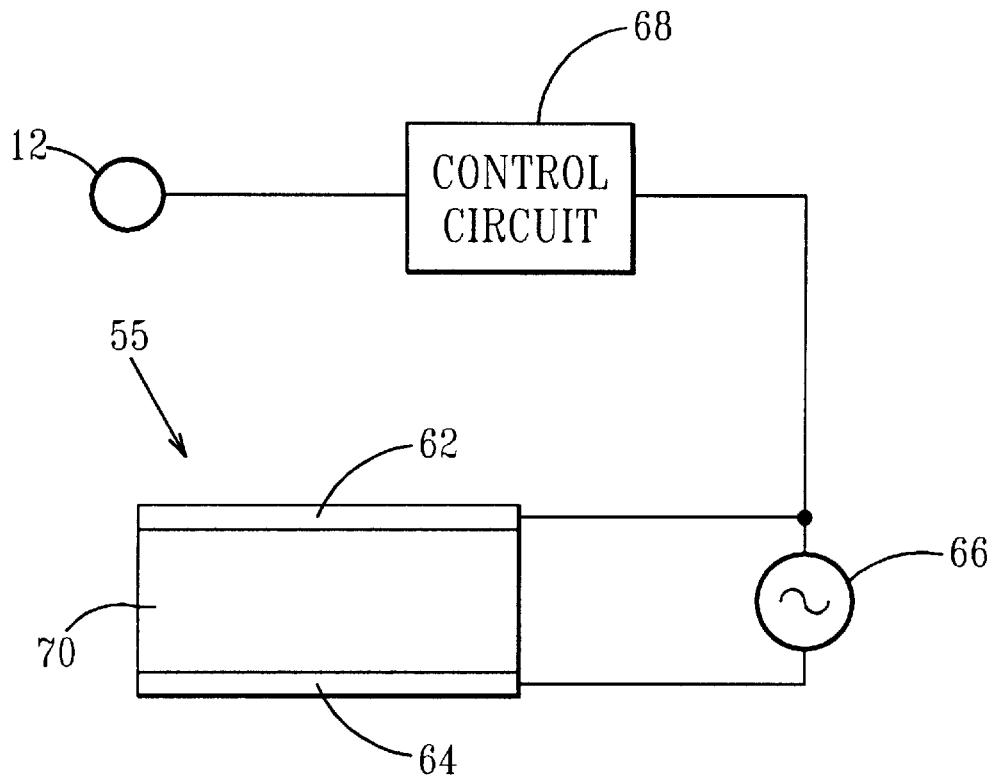
FIG. 3 shows a block diagram of an electrically switchable diffuser according to the present invention.

FIG. 3 shows the electrically switchable or variable diffuser 55. The variable diffuser has top and bottom electrodes 62, 64 connected to a signal source 66. A control circuit 68 is connected between the signal source and the backlight 12. For example, the electrodes 62, 64 are made of mixed oxides on indium and tin (ITO), and the signal source 66 provides an AC signal. An electrically switchable element 70 is located between the two electrodes 62, 64.

In response to a signal from the signal source, power to the backlight 12 is adjusted by the control circuit 68 and an electric field is applied across the electrodes 62, 64. The electric field changes the scattering or diffusion property of the electrically switchable element 70 to vary the viewing angle. At the same time, the control circuit 68 adjust the backlight power to provide adequate display luminance over the viewing angle. Thus, the signal which causes adjustment of the viewing angle also causes automatic adjustment of the backlight power. The adjustment of both viewing angle and backlight power maintains optimal conditions, i.e., adequate display luminance at any selected viewing angle.

Illustratively, the electrically switchable element 70 comprises a reverse mode polymer stabilized cholesteric texture (RM-PCST) structure. Cholesteric material has molecules which are aligned in a helical pattern with a pitch greater than one micron in the off-state when no electrical field is applied. In the absence of an electric field, i.e., in the off-state, the cholesteric material is transparent. In the on-state, the applied electrical field disrupts the helical pattern of molecules of the cholesteric material to provide scattering as is well known in the art. The scattering increases the solid viewing angle. The scattering and viewing angle are proportional to the applied electrical field up to a certain maximum value, Vmax. Thus, the larger the applied electrical field (up to Vmax), the larger the scattering and viewing angle.

The RM-PSCT cell has at least one layer of cholesteric material located between ITO coated polymeric substrates, as is well known in the art. The RM-PCST cell can be switched from a stable transparent field off state to a scattering field on state by the application of an electrical field. The electric field is provided by the signal generator 66. The cell 55 is a single addressable unit covering the entire area of the display 10.

In another embodiment, the electrically switchable element 70 of the electrically switchable diffuser 55 may be an electrically switchable hologram. AS is well known in the art, volume holograms are produced in a polymer film. The polymer film has low and high refraction index positions. The low index positions are empty voids or open cells. Holograms are produced in which the voids are back filled with nematic liquid crystals that have electrically variable refractive indices.

By placing this polymer film in an electric field, the hologram can be switched from an index matched state, where the film is substantially transparent, to an index mismatched state where the hologram is effective. Conventional electrically switchable holographic mirrors are produced using this technique. A holographic diffuser may be made in a similar fashion as conventional holographic mirrors. For example, the same photo-polymerisable material may be used for both holographic mirrors and holographic diffusers.

The inventive holographic diffuser is an LC filled electrically switchable holographic diffuser. As with the RM-PSCT diffuser, the switchable holographic diffuser is sandwiched between sheets of ITO coated polymers acting as electrodes. Illustratively, the holographic diffuser is approximately 10 μm thick.

The cholesteric material of the RM-PSCT cell or the LC filled holographic diffuser are formed from optically anisotropic active material. For example, the switchable diffuser 55 may be formed from a nematic liquid crystal or a chiral nematic liquid crystalline phase. Alternatively, the switchable diffuser 55 may be formed from a polymer dispersed liquid crystalline phase.

In addition, scattering properties of the switchable diffuser can be varied with position. In the case of the PSCT diffuser, this is achieved by modifying the layer thickness or the chiral pitch. In the case of the holographic diffuser, the scattering properties are varied with position by modifying the exposure conditions. The diffuser 55 may also be scattering in both the on and off states, where each state has different scattering properties.

Figure 4:
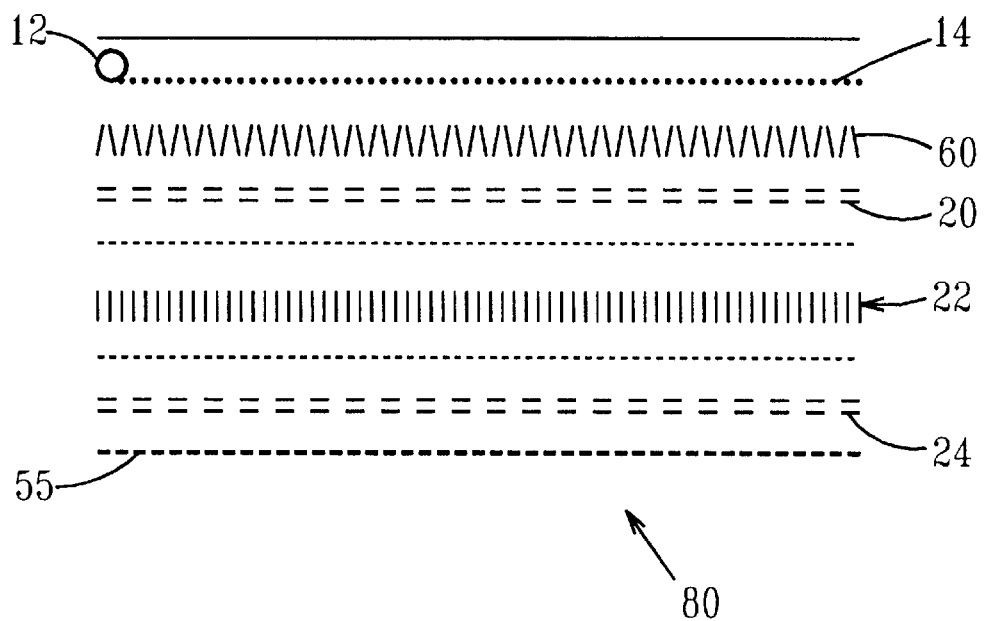
FIG. 4 shows a schematic of another embodiment of a display according to the present invention.

FIG. 4 shows a display 80 which is another embodiment of the present invention, where the diffuser 16 of FIG. 2 is deleted and the switchable diffuser 55 is located in front of the front polarizer 24. As described in connection with FIG. 2, light passing through the liquid crystal cell 22 will have a small solid angle and will be substantially collimated by the brightness enhancing film 60. In this embodiment, a transducer or liquid crystal light valve 22 having a narrow viewing angle may be used. This dispenses with the need to have a wide angle transducer 22.

Illustratively, the light source 12 is an edge light source and may be a fluorescent lamp. Edge light sources have the advantage of producing non-uniform left to right luminance. Fluorescent lamps provide a light source with good color balance and good luminance efficacy. However, light intensity from fluorescent lamps can only be varied by a factor of two without deleterious effects. In order to increase the range of light intensity variation, more than one lamp may be used.

Figure 5:
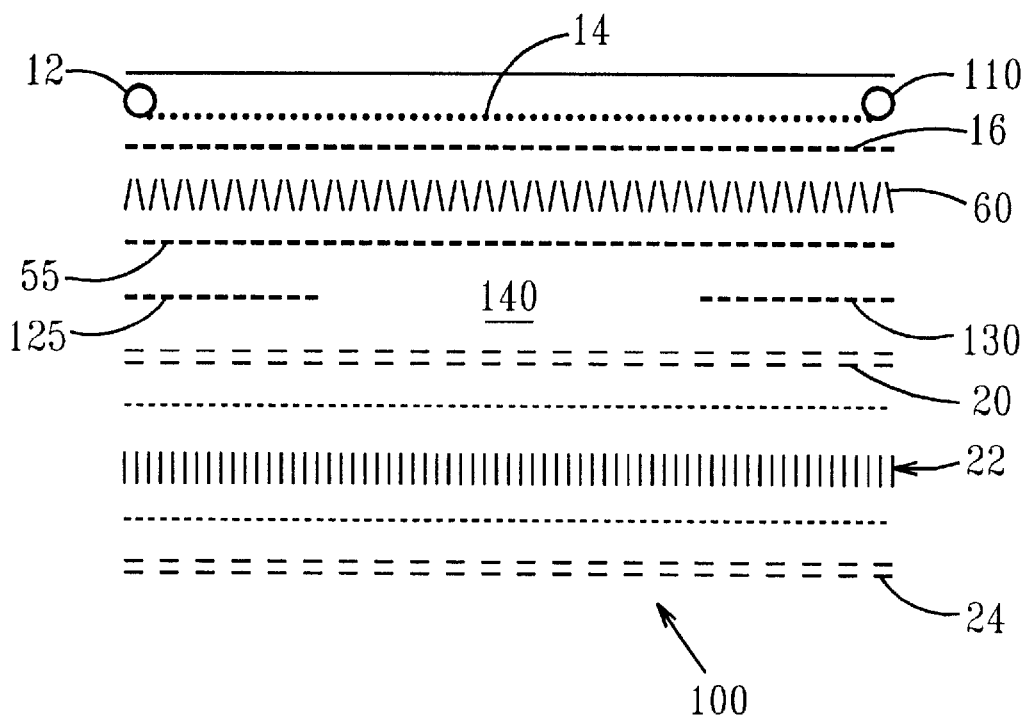
FIG. 5 shows a schematic of yet another embodiment of a display according to the present invention.

FIG. 5 shows a display 100 which uses two lamps to increase the range of illumination or light intensity. The increased illumination range increases the range of usable viewing angle. Illustratively, the range of usable viewing angles is approximately from ±10 degrees and to ±70 degrees.

In the case of multiple lamps, some lamps are turned off for low power operation, and turned on for maximum wide viewing angle operation. If the switchable diffuser 55 is arranged for even luminance distribution over the surface of the display 100 in the low power mode, turning on the additional lamps causes the brightness distribution to become non-uniform.

To correct this and provide uniform brightness distribution, additional switchable diffusers are provided. The additional switchable diffusers are located where the amount of diffusion in the high diffusion state is non uniform between the switchable diffuser 55 and the cell 22. Illustratively, two additional switchable diffusers 125, 130 are provided.

As shown in FIG. 5, the two additional diffusers 125, 130 are located between the rear polarizer 20 and the electrically switchable diffuser 55. In addition to the light source 12, a second light source 110 is provided. The additional diffusers 125, 130 are provided over brighter areas. Having the higher diffusion over the brighter areas will cause additional light to be scattered back into the light guide 14. The light will then be more likely to exit through the lower diffusion region 140 located between the additional diffuser 125 and 130. This is because of the reduced chance of back scattering. The additional diffusers provide uniform brightness distribution over the display 100.

The present invention may be used to eliminate left to right luminance uniformity from the edge light assembly and to direct light off normal so as to maximize luminous efficacy.

The inventive display provides a user with an option to choose between preserving battery life and maximizing viewing angle. For example, the user may switch to a low power, private viewing mode where the display backlight and the viewing angle are reduced. Alternatively, the user may switch to a high power wide angle or group viewing mode where the display backlight and the viewing angle are increased. Thus, depending on the requirement, a user chooses whether to preserve battery life or to maximize viewing angle.

While the invention has been particularly shown and described with respect to illustrative and preformed embodiments thereof, it will be understood by those skilled in the art that the foregoing and other changes in form and details may be made therein without departing from the spirit and scope of the invention which should be linked only by the scope of the appended claims.

Having thus described our invention, what we claim as new, and desire to secure by Letters Patent is:

1. A display comprising:
   an illumination means to provide a substantially uniform illumination;
   a cell which receives said illumination; and
   a switchable diffuser located between said illumination means and said cell, said switchable diffuser varying a viewing angle of said display, wherein said switchable diffuser and said illumination means are responsive to a signal that varies said display between a low illumination/narrow viewing angle mode and a high illumination/wide viewing angle mode.

2. The display of claim 1, wherein said switchable diffuser is substantially transparent in absence of said signal to provide a narrow viewing angle, and wherein said switchable diffuser is substantially light scattering in presence of said signal to widen the viewing angle.

3. The display of claim 1 further comprising:
   a brightness enhancing film located between said illumination means and said switchable diffuser, said brightness enhancing film providing light having a predetermined viewing angle to said switchable diffuser.

4. The display of claim 1 further comprising:
   a rear polarizer located at a first side of said cell between said switchable diffuser and said cell; and
   a front polarizer located at a second side of said cell, said second side being opposite to said first side.

5. The display of claim 1, wherein said illumination means comprises:
   at least one light source to provide light;
   a light guide which receives said light and provides substantially equal intensity light; and
   a diffuser which scatters said substantially equal intensity light to provide said substantially uniform illumination.

6. The display of claim 1, wherein said switchable diffuser is formed from a liquid crystal.

7. The display of claim 6, wherein said liquid crystal is a polymer stabilized cholesteric texture liquid crystal.

8. The display of claim 6, wherein said liquid crystal is a nematic liquid crystal.

9. The display of claim 6, wherein said liquid crystal is a chiral nematic liquid crystal.

10. The display of claim 6, wherein said liquid crystal is a polymer dispersed liquid crystal.

11. The display of claim 1, wherein said switchable diffuser is formed from an electrically switchable holographic medium.

12. The display of claim 1 further comprising:

a signal source which provides said signal;

a pair of electrodes electrically connected to said signal source wherein said switchable diffuser is located between said pair of electrodes; and a control unit located between said signal source and said illumination means, said control unit adjusting intensity of said illumination means in response to said signal.

13. The display of claim 12 wherein, in response to said signal, said viewing angle and intensity are varied to provide a desired viewing angle and adequate display luminance.

14. The display of claim 1 further comprising switchable diffuser segments located at areas between said switchable diffuser and said cell, said area being brighter than remaining areas not covered by said segments, wherein said segments provide uniform brightness distribution over said display.

15. A display comprising:

an illumination means to provide illumination at a predetermined viewing angle, said illumination means being located at a rear of said display;

a cell which receives said illumination; and a switchable diffuser located at a front of said display, wherein in response to a signal said switchable diffuser changes from a substantially transparent state to a scattering state, said signal switching said display between a low illumination/narrow viewing angle mode, corresponding to said substantially transparent state, and a high illumination/wide viewing angle mode, corresponding to said scattering state.

16. A display comprising:

an illumination means to provide a substantially uniform illumination;

a cell which receives said illumination; and a variable diffuser located between said illumination means and said cell, wherein in response to a signal said variable diffuser changes from a substantially transparent state to a scattering state, said signal varying said display between a low illumination/narrow viewing angle mode, corresponding to said substantially transparent state, and a high illumination/wide viewing angle mode, corresponding to said scattering state.

* * * * *